(12) United States Patent
Kurth

(10) Patent No.: US 6,180,686 B1
(45) Date of Patent: Jan. 30, 2001

(54) CELLULAR PLASTIC MATERIAL

(76) Inventor: Thomas M. Kurth, 16910 2200 North, Princeton, AL (US) 61356

( * ) Notice: Under 35 U.S.C. 154(b), the term of this patent shall be extended for 0 days.

(21) Appl. No.: 09/154,340

(22) Filed: Sep. 17, 1998

(51) Int. Cl.⁷ .............................. C08J 9/34; C08L 75/00; C08H 5/00; C08G 18/00
(52) U.S. Cl. .................. 521/51; 521/84.1; 521/109.1; 521/137; 521/151; 521/155
(58) Field of Search .................. 521/51, 84.1, 109.1, 521/137, 151, 155

(56) References Cited

U.S. PATENT DOCUMENTS

| | | |
|---|---|---|
| 2,787,601 | 4/1957 | Detrick et al. . |
| 2,833,730 | 5/1958 | Barthel . |
| 4,005,035 | 1/1977 | Deaver . |
| 4,185,146 | 1/1980 | Burke . |
| 5,447,963 | 9/1995 | Pcolinsky et al. . |
| 5,482,980 | 1/1996 | Pcolinsky . |
| 5,496,869 | 3/1996 | Williams et al. . |
| 5,627,221 | 5/1997 | Schumacher et al. . |
| 5,710,190 | 1/1998 | Jane et al. . |
| 5,756,195 | 5/1998 | Allen et al. . |
| 5,766,704 | 6/1998 | Allen et al. . |
| 5,869,546 * | 2/1999 | Gruss et al. ................... 521/159 |
| 5,922,779 | 7/1999 | Hickey . |

FOREIGN PATENT DOCUMENTS

| | | |
|---|---|---|
| 704532 | 2/1997 | (AU) . |
| 9707150 | 2/1997 | (EP) . |
| 9807777 | 2/1998 | (WO) . |

OTHER PUBLICATIONS

R. West Handbook of Chemistry and Physics (54th ed. 1973–74), at C–214–15, X–275, C–277, C–288–89, C–296–97, C–312–14, C–325–26, C–357, C–370–73, C–396–98, C–455, C–506, D–189, D–190.

Modern Plastics Encyclopedia (1968), at 100–01, 113, 352, 354, 356, 358–60.

Johnson & Peterson, Encyclopedia of Food Technology (1984), at 818–828.

* cited by examiner

Primary Examiner—Nathan M. Nutter
(74) Attorney, Agent, or Firm—Price, Heneveld, Cooper, DeWitt & Litton

(57) ABSTRACT

An improved cellular plastic material comprises a urethane foam that is the reaction product of soy oil, an isocyanate, and a cross linker. The soy oil replaces the polyol typically generally required in the production of urethanes. Because the replaced polyol is a petrochemical, use of a renewable and environmentally friendly material such as soy oil is most advantageous. Further, plastic materials of many final qualities may be formed using a single vegetable oil. In addition to cellular foams, solid plastic elastomers may be formed.

26 Claims, No Drawings

CELLULAR PLASTIC MATERIAL

FIELD OF THE INVENTION

This invention relates to plastic elastomers and their method of preparation. Specifically, the present invention relates to flexible urethane foams and elastomers prepared by the reaction between isocyanates, cross-linking agents, and vegetable oils, particularly blown soy oil.

BACKGROUND OF THE INVENTION

Because of their widely ranging mechanical properties and their ability to be relatively easily machined and formed, plastic foams and elastomers have found wide use in a multitude of industrial and consumer applications. In particular, urethane foams and elastomers have been found to be well suited for many applications. Automobiles, for instance, contain a number of components, such as cabin interior parts, that are comprised of urethane foams and elastomers. Such urethane foams are typically categorized as flexible (or semi-rigid) or rigid foams; with flexible foams generally being softer, less dense, more pliable and more subject to structural rebound subsequent loading than rigid foams.

The production of urethane foams and elastomers is well known in the art. Urethanes are formed when NCO groups react with hydroxyl groups. The most common method of urethane production is via the reaction of a polyol and an isocyanate which forms the backbone urethane group. A cross linking agent may also be added. Depending on the desired qualities of the final urethane product, the precise formulation may be varied. Variables in the formulation include the type and amounts of each of the reactants.

In the case of a urethane foam, a blowing agent is added to cause gas or vapor to be evolved during the reaction. The blowing agent creates the void cells in the final foam, and may be a relatively low boiling solvent or water. A low boiling solvent evaporates as heat is produced during the isocyanate/polyol reaction to form vapor bubbles. If water is used as a blowing agent, a reaction occurs between the water and the isocyanate group to form an amine and $CO_2$ gas in the form of bubbles. In either case, as the reaction proceeds and the material solidifies, the vapor or gas bubbles are locked into place to form void cells. Final urethane foam density and rigidity may be controlled by varying the amount or type of blowing agent used.

A cross-linking agent is often used to promote chemical cross-linking to result in a structured final urethane product. The particular type and amount of cross-linking agent used will determine such final urethane properties such as elongation, tensile strength, tightness of cell structure, tear resistance and hardness. Generally, the degree of cross-linking that occurs correlates to the flexibility of the final foam product. Relatively low molecular weight compounds with greater than single functionality are found to be useful as cross-linking agents.

Catalysts may also be added to control reaction times and to effect final product qualities. The effects of catalysts generally include the speed of the reaction. In this respect, the catalyst interplays with the blowing agent to effect the final product density; the reaction should proceed at a rate such that maximum gas or vapor evolution coincides with the hardening of the reaction mass. Also, the effect of a catalyst may include a faster curing time, so that a urethane foam may be produced in a matter of minutes instead of hours.

Polyols used in the production of urethanes are petrochemicals, being generally derived from ethylene glycol. Polyester polyols and polyether polyols being the most common polyols used in urethanes production. For semi-rigid foams, polyester or polyether polyols with molecular weights of from 3,000 to 6,000 are generally used, while for flexible foams shorter chain polyols with molecular weight of from 600 to 4,000 are generally used. There is a very wide variety of polyester and polyether polyols available for use, with a particular polyols being used to engineer and produce a particular urethane elastomer or foam having desired particular final toughness, durability, density, flexibility, compression set ratios and modulus and hardness qualities. Generally, lower molecular weight polyols and lower functionality polyols tend to produce more flexible foams than do heavier polyols and higher functionality polyols. In order to eliminate the need to produce, store, and use different polyols, it would be advantageous to have a single versatile component that was capable of being used to create final urethane foams of widely varying qualities.

Further, use of petrochemicals such as polyester or polyether polyols is disadvantageous for a variety of reasons. As petrochemicals are ultimately derived from petroleum, they are a non-renewable resource. The production of a polyol requires a great deal of energy, as oil must be drilled, extracted from the ground, transported to refineries, refined and otherwise processed to yield the polyol. These required efforts add to the cost of polyols, and to the disadvantageous environmental effects of its production. Also, the price of polyols tends to be somewhat unpredictable as it tends to fluctuate based on the fluctuating price of petroleum.

Also, as the consuming public becomes more aware of environmental issues, there are distinct marketing disadvantages to petrochemical based products. Consumer demand for "greener" products continues to grow.

It would therefore be most advantageous to replace polyester or polyether polyols as used in the production of urethane elastomers and foams with a more versatile, renewable, less costly, and more environmentally friendly component.

Efforts have been made to accomplish this. Plastics and foams made using fatty acid triglycerides derived from vegetables have been developed, including soy bean derivatives. Because soy beans are a renewable, relatively inexpensive, versatile, and environmentally friendly, they are desirable as ingredients for plastics manufacture. Soy beans may be processed to yield fatty acid triglyceride rich soy oil and a protein rich soy flour.

Unlike urethanes, many plastics are protein based. For these types of plastics, soy protein based formulations have been developed. U.S. Pat. No. 5,710,190, for instance, discloses the use of soy protein in the preparation of a thermoplastic foam. Such plastics, however, are not suitable for use in applications that call for the particular properties of urethanes. Since urethanes don't utilize proteins in their formulations, soy proteins are not relevant for urethane manufacture.

Epoxidized soy oils in combination with polyols have also been used to formulate plastics and plastic foams, including urethanes. For example, U.S. Pat. No. 5,482,980 teaches use of an epoxidized soy oil in combination with a polyol to produce a urethane foam. A polyester or polyether polyol remains in the formulation, however. Also, as the epoxidation processing of the soy oil requires energy, materials and time, use of an un-modified soy oil would be more advantageous.

Efforts have been made to produce a urethane type cellular plastic from un-modified soy oil. U.S. Pat. Nos.

2,787,601 and 2,833,730 disclose a rigid cellular plastic material that may be prepared using any of several vegetable oils, including soy oil. The foam disclosed in these patents, however, is made from a multistep process requiring the preparation of a pre-polymer and, in the case of U.S. Pat. No. 2,833,730, relatively low cross-linker concentrations are urged, resulting in questionable product stability. Further, use of a particular isocyanate, namely toluene diisocyanate, is disclosed which is disadvantageous due to its relatively high toxicity.

An unresolved need therefore exists in industry for a urethane elastomer and a flexible urethane foam, and a method of producing such materials, that are based on a reaction between isocyanates and a relatively inexpensive, versatile, renewable, environmentally friendly material such as vegetable oils as a replacement for polyether or polyester polyols.

OBJECTS OF THE INVENTION

It is an object of the invention to provide a flexible urethane foam resulting from the product of a reaction between an isocyanate and a vegetable oil as a replacement for a petroleum-based polyester or polyether polyol, along with other reactants.

It is an additional object of the invention to provide a single versatile component from which a variety of differing quality foam products could be produced.

It is yet another object of the invention to provide a method for making flexible urethane foam using a renewable vegetable oil source as a replacement for petroleum-based polyester or polyether polyols, and other reactants.

It is a further object of the invention to provide a urethane elastomer that is a product of a reaction between an isocyanate and a vegetable oil as a replacement for petroleum-based polyester or polyether polyols, and other reactants.

SUMMARY OF THE INVENTION

The present invention comprises a flexible urethane foam that is a product of a reaction free of petroleum-based polyester or polyether polyols, and that is instead between an isocyanate and a vegetable oil along with other reactants. The present invention further comprises a method for making a flexible urethane foam using a vegetable oil as a replacement for such polyols. The present invention further comprises an elastomer product of a reaction between at least an isocyanate, a cross linking agent, and a vegetable oil; as well as a method of making an elastomer product using at least an isocyanate, a cross linking agent, and a vegetable oil.

The preparation of urethanes is well known in the art. They are generally produced by the reaction of petrochemical polyols, either polyester or polyether, with isocyanates. The flexibility or rigidity of the foam is dependent on the molecular weight and functionality of the polyol and isocyanate used.

Petrochemical polyol-based polyurethanes can be prepared in a one step or a two step process. In the one step process, what is known in the art as an A-side reactant is combined with what is known as a B-side reactant. The A-side is considered to comprise an isocyanate, and usually is based on diphenylmethane diisocyanate ("MDI") or toluylenediisocyanate ("TDI"). The particular isocyanate chosen will depend on the particular final qualities desired in the urethane.

The B-side material is generally a solution of a petroleum-based polyester or polyether polyol, cross linking agent, and blowing agent. A catalyst is also generally added to the B-side to control reaction speed and effect final product qualities. As discussed infra, the use of a petrochemical such as a polyester or polyether polyol is undesirable for a number of reasons.

It has been discovered, however, that flexible urethane foams of a high quality can be prepared by substituting the petroleum-based polyol in the B-side preparation with a vegetable oil in the presence of a multi-functional alcohol cross-linking agent having a molar ratio of the OH groups of the cross-linking agent OH groups to the bulk vegetable oil is at least 0.7 to 1, and preferably between about 0.7 and 1.2 to 1. The replacement is made on a substantially 1:1 weight ratio of vegetable oil for replaced petroleum-based polyol. The process of producing the urethane does not change significantly with the petroleum-based polyol replaced by the vegetable oil, with all other components and general methods as are generally known in the art. The qualities of the final flexible or semi-rigid urethane foam produced using the vegetable oil are consistent with those produced using a high grade, expensive polyol.

Further, it has surprisingly been discovered that with use of a single vegetable oil, urethane foams of varying and selectable final qualities, including differing flexibility's, densities, and hardnesses, can be made by varying only the primary reactants. It would be difficult, if not impossible, to create such varied final foams using a single petroleum-based polyester or polyether polyol with the same variations in the remaining reactants. Instead, different petroleum-based polyols would be required to produce such varied results.

The use of vegetable oil in the urethane forming reaction also realizes a significant cost savings. Vegetable oils are abundant, renewable, and easily processed commodities, as opposed to polyols, which petroleum derivatives and which entail significant associated processing costs. As such, they may currently be acquired for a cost of approximately half that of average grade petroleum-based polyester or polyether polyols, and approximately one quarter the cost of high grade petroleum-based polyester or polyether polyols. Also, as polyols derived from petroleum, they are not renewable and carry a certain environmental cost with them. There is a distinct marketing advantage to marketing products that are based on environmentally friendly, renewable resources such as vegetable oils.

The A-side isocyanate reactant of the urethane of the invention is preferably comprised of a isocyanate chosen from a number of suitable isocyanates as are generally known in the art. Different isocyanates may be selected to result in different final product properties. The A-side reactant of the urethane of the invention preferably comprises diphenylmethane diisocyanate (MDI).

The B-side reactant of the urethane reaction includes at least the vegetable oil, a cross-linking agent, and a blowing agent. It is believed that the isocyanate reacts with the fatty acids of the vegetable oil to produce the polymeric backbone of the urethane.

The vegetable oils that are suitable for use tend to be those that are relatively high in triglyceride concentration and that are available at a relatively low cost. The preferred vegetable oil is soy oil, although it is contemplated that other vegetable oils, such as rapeseed oil (also known as canola oil) and palm oil can be used in accordance with the present invention. Except for the preliminary blowing step, where air is passed through the oil to remove impurities and to thicken it, the soy oil is otherwise unmodified. It does not require esterification as is required for some urethane products of the prior art.

Except for the use of the preferred unmodified, blown soy oil replacing the polyol, the preferred B-side reactant used to produce the foam of the invention is generally known in the art. Accordingly, preferred blowing agents for the invention are those that are likewise known in the art, and may be chosen from the group comprising 134A HCFC refrigerant available from Dow Chemical Co., Midland Mi., methyl isobutyl ketone (MIBK), acetone and methylene chloride. These preferred blowing agents boil to create vapor bubbles in the reacting mass. Should other blowing agents be used that react chemically, such as water, to produce a gaseous product, concentrations of other reactants may be adjusted to accommodate the reaction.

The cross-linking agents of the foam of the present invention are also those that are well known in the art. They must be at least di-functional. The preferred cross-linking agents for the flexible foam of the invention are ethylene glycol and 1,4 butanediol. It has been found that a mixture of these two cross-linking agents is particularly advantageous in the practice of the present invention. Ethylene glycol tends to offer a shorter chain molecular structure with many "dead end" sites, tending to create a firmer final foam resistant to tearing or "unzipping," while butane diol offers a longer chain molecular structure, tending to create a softer foam. Proper mixture of the two can create engineered foams of almost any desired structural characteristics.

In addition to the B-side's soy oil and blowing agent, one or more catalysts may be present. Preferred catalysts for the urethanes of the present invention are those that are generally known in the art, and are most preferably tertiary amines chosen from the group comprising DABCO 33-VL comprised of 33% 1,4 diaza-bicyclco-octane and 67% dipropylene glycol, gel catalyst available from the Air Products Corporation; DABCO BL-22 blowing catalyst available from the Air Products Corporation; and POLYCAT 41 trimerization catalyst available from the Air Products Corporation.

Also as known in the art, the B-side reactant may further comprise a silicone surfactant which functions to influence liquid surface tension and thereby influence the size of the bubbles formed and ultimately the size of the hardened void cells in the final foam product. This can effect foam density and foam rebound (index of elasticity of foam). Also, the surfactant may function as a cell opening agent to cause larger cells to be formed in the foam. This results in uniform foam density, increased rebound, and a softer foam.

A molecular sieve may further be present to absorb excess water from the reaction mixture. The preferred molecular sieve of the present invention is available under the trade name L-past.

The preferred flexible and semi-rigid foams of the invention will have greater than approximately 60% open cells. The preferred flexible foam of the invention will also have a density of from 1 to 45 lb. per cubic foot and a hardness of durometer between 20 and 70 Shore "A".

The urethane foam of the present invention is produced by combining the A-side reactant with the B-side reactant in the same manner as is generally known in the art. Advantageously, use of the vegetable oil to replace the petroleum-based polyol does not require significant changes in the method of performing the reaction procedure. Upon combination of the A and B side reactants, a reaction ensues which generates heat, and which may reach completion in anywhere from several minutes to several hours depending on the particular reactants and concentrations used. Typically, the reaction is carried out in a mold so that the foam expands to fill the mold, thereby creating a final foam product in the shape of the mold.

The components may be combined in differing amounts to yield differing results, as will be shown in the Examples presented in the Detailed Description below. Generally, however, the preferred flexible foam of the invention B-side mixture, when using the preferred components, is prepared with the following general weight ratios:

| Blown soy oil | 100 parts |
|---|---|
| Cross linking agent | 8–15 parts |
| Blowing agent | 8–15 parts |
| Catalyst | 1–12 parts |

This preferred B-side formulation is then combined with the A-side to produce a foam. The preferred A-side is comprised of MDI, and is present in an approximate ratio of about 70–85 parts to 100 parts B-side, Flexible urethane foams may be produced with differing final qualities using the same vegetable oil by varying the particular other reactants chosen. For instance, it is expected that the use of relatively high molecular weight and high functionality isocyanates will result in a less flexible foam than will use of a lower molecular weight and lower functionality isocyanate when used with the same vegetable oil. Similarly, it is expected that lower molecular weight and lower functionality cross linkers will result in a more flexible foam than will higher molecular weight higher functionality cross linkers when used with the same vegetable oil. Also, a ethylene glycol cross linker will result in shorter final chains and a firmer foam; while use of a butane diol cross linker results in longer chains and a softer foam.

Urethane elastomers can be produced in much the same manner as urethane foams, except that a blowing agent is not present to create void cells in the material. It has been discovered that useful urethane elastomers may be prepared using a vegetable oil to replace a petroleum-based polyester or polyether polyol. The preferred elastomer of the invention is produced using MDI; 1, 4, butanediol cross linking agent; and a vegetable oil, preferably soy oil. A catalyst may be added to the reaction composition to speed the reaction. The preferred elastomer of the invention is prepared by combining the reactants; an exothermic reaction follows resulting in the elastomer. The preferred elastomer has an approximate density of from 65 to 75 lb. per cubic foot.

The above brief description sets forth rather broadly the more important features of the present disclosure so that the detailed description that follows may be better understood, and so that the present contributions to the art may be better appreciated. There are, of course, additional features of the disclosure that will be described hereinafter which will form the subject matter of the claims appended hereto. In this respect, before explaining the several embodiments of the disclosure in detail, it is to be understood that the disclosure is not limited in its application to the details and the arrangements set forth in the following description. The present invention is capable of other embodiments and of being practiced and carried out in various ways, as will be appreciated by those skilled in the art. Also, it is to be understood that the phraseology and terminology employed herein are for description and not limitation.

The objects of the invention have been well satisfied. These advantages and others will become more fully apparent from the following detailed description when read in conjunction with the accompanying drawings.

DETAILED DESCRIPTION OF THE PREFERRED EMBODIMENT

The present invention comprises a flexible or semi-rigid urethane foam that is the reaction product of at least an isocyanate, a vegetable oil, and a cross linking agent. The reaction is free of petroleum-based polyester or polyether polyols. The present invention further comprises a method of making a flexible or semi-rigid urethane foam using at least an isocyanate, a vegetable oil, and a cross linking agent. The present invention further comprises an elastomer product of a reaction between at least an isocyanate, a cross linking agent, and a vegetable oil; as well as a method of making an elastomer product using at least an isocyanate, a cross linking agent, and a vegetable oil.

The flexible or semi-rigid urethane foam of the invention is the reaction product of a isocyanate, a vegetable oil, and a cross linking agent. The vegetable oil replaces petroleum-based polyester or polyether polyols traditionally used in urethane preparation. By replacing these petroleum-based polyols, the flexible or semi-rigid foam of the present invention offers a more cost-effective and environmentally friendly urethane foam. Further, the use of a single vegetable oil surprisingly allows for a variety of different final quality foams to be produced by varying other reactants. The preferred vegetable oil used to prepare the urethane foam of the invention is selected from the group comprising palm oil, soy oil, and cottonseed oil; and is most preferably comprised of blown soy oil.

The following examples of preparation of foams and elastomers of the invention summarized in Table A will illustrate various embodiments of the invention. In the Examples, the "B-Side" (soy oil and other components), once blended, has a shelf life of several months. The A-side material in the following examples is comprised of modified diphenylmethane diisocyanate ("MDF"). There are four different MDI materials specified in the following examples; all are modified monomeric diphenylmethane diisocyanates available from the Bayer Corp., Polymers Division, Rosemont Ill.: "Mondur MA-2901" (Bayer Product Code No. C-1464); "Mondur-448" (Bayer Product Code No. G-448), "Mondur MRS-20", and "Mondur-PF".

Also, "cure" in the following examples refers to the final, cured foam taken from the mold. The soy oil used in the following examples is blown soy oil obtained from Cargill, in Chicago, Ill. Catalysts used include "DABCO 33-LV", comprised of 33% 1,4-diaza-bicyclo-octane and 67% dipropylene glycol available from the Air Products Urethanes Division; "DABCO BL-22" tertiary amine blowing catalyst also available from the Air Products Urethanes Division; and "POLYCAT 41" n, n', n", dimethylamino-propyl-hexahydrotriazine tertiary amine also available from the Air Products Urethanes Division.

Catalysts in the following Examples may be referred to as "front end", "back end", and "blowing". Front end catalysts tend to speed the early portion of the reaction, while back end catalysts tend to speed the later, curing portion of the reaction. A blowing catalyst effects the timing of the activation of the blowing agent. Some of the Examples include "L-past", which is a trade name for a molecular sieve for absorbing water. Some also contain "DABCO DC 5160" silicone surfactant available from Air Products Urethane Division.

EXAMPLES

Example 1

The B-side material was prepared as follows:

| | |
|---|---|
| 50 g | Soy Oil (blown) |
| 5 g | Ethylene Glycol (blowing agent) |
| 1 g | Front end catalyst (DABCO 33-VL) |
| 1 g | Blow catalyst (DABCO BL-22) |
| 4 g | Methyl Isobutyl Ketone (blowing agent) |

Blown soy oil has a molecular weight of about 278, while the ethylene glycol has a has a molecular weight of about 62. Thus, the molar ratio of ethylene glycol to bulk blown soy oil is 0.22 to 1. Since the ethylene glycol has two OH groups with which to cross-link the constituent fatty acids of the bulk blown soy oil, the molar ratio of the OH groups of the ethylene glycol to bulk soy oil is about 0.45:1. The resulting B-side was then combined with an A-side material in a ratio of 50 parts A-side to 100 parts B-side. The A-side material is comprised of Mondur 448. The cure was acceptable, however, it remained tacky at the surface for 20 minutes.

Example 2

The B-side is the same as that of Example I; the A-side is comprised of MA-2901. The ratio of A to B sides was 52 to 100 parts. The cure was acceptable, although it remained tacky for 12 minutes.

Example 3

The B-side is again the same as that of Example 1, except that 1.5 parts of methanol was added as additional blowing agent. The ratio of A to B was 52 parts to 100 parts. The sample cured in 1 hour. It was not a favorable result in that it foamed and then fell back to solid and rose again. The methanol apparently had an adverse affect.

Example 4

| B-side: | 100 g | Soy Oil |
|---|---|---|
| | 5 g | Ethylene Glycol |
| | 2.5 | Front end catalyst (DABCO 33-VL) |
| | 2.5 | Blow catalyst (DABCO BL-22) |
| | 4 g | Methyl Isobutyl Ketone (MIBK) |

The materials were reacted in a ratio of 50 parts A-side to 100 parts B-side. The results were a good foam, but weak in tensile strength.

Example 5

The B-side is the same as that of Example 4. The A-side is likewise the same. The A-side was mixed 52 parts to 100 parts B-side. Results were essentially the same as in Example 4 with a little better tensile strength.

Example 6

| B-Side: | 103 g | Soy Oil |
|---|---|---|
| | 10 g | Ethylene Glycol |
| | 1 g | Acetone (Blowing agent) |
| | 2.5 | Front end catalyst (DABCO 33-VL) |
| | 2.5 | Blow catalyst (DABCO BL-22) |

The molar ratio of ethylene glycol to bulk blown soy oil is 0.44 to 1. With two OH groups with which to cross-link the constituent fatty acids of the bulk blown soy oil, the molar ratio of the OH groups of the ethylene glycol to bulk soy oil is about 0.90:1. The A-side comprises 52 parts MA-2901 to 100 parts B-side. The resulting foam was very hard and its cell size too large. It fell back to a solid, largely due to too much blowing agent.

Example 7

| B-side: | 100 g | Soy Oil |
|---|---|---|
| | 8 g | Ethylene Glycol |
| | 5 g | Acetone (Blowing agent) |
| | 2.5 | Front end catalyst (DABCO 33-VL) |
| | 2.5 | Blow catalyst (DABCO BL-22) |

The molar ratio of ethylene glycol to blown soy oil is 0.35 to 1. With two OH groups with which to cross-link the constituent fatty acids of the blown soy oil, the molar ratio of the OH groups of the ethylene glycol to soy oil is about 0.70:1. The A-side comprises MA-2901 and is present in 51 parts to 100 parts B-side. The resulting foam is a generally good foam, having low tensile but a better density range.

Example 8

The B-side is the same as that of Example 7. The A-side also comprises MA-2901 as in Example 7. The A-side is present in a ration of 45 parts to 100 parts B-side.

Example 9

The B-side is the same as in Example 7, with the A-side likewise again comprised of MA-2901. 72 parts A-side are present to 100 parts B-side. The resulting foam fell back and did not cure after 1 hour, indicating an overcharge of A-side.

Example 10

| B-side | 100 g | Soy Oil |
|---|---|---|
| | 11 g | Ethylene Glycol |
| | 4 g | Methyl Isobutyl Ketone (MIBK) |
| | 3 g | front end catalyst (DABCO 33-VL) |
| | 3 g | Blow catalyst (DABCO BL-22) |

The molar ratio of ethylene glycol to bulk sown soy oil is 0.49:1. With two OH groups with which to cross-link the constituent fatty acids of the blown soy oil, the molar ratio of the OH groups of the ethylene glycol to soy oil is about 0.99:1. The A-side comprised MA-2901, and was present in a ratio of 50 parts to 100 parts B-side. The resulting foam had a 15 minute cure, very slow recovery. However, the final cure was insufficient. A full cure didn't occur until after 72 hours.

Example 11

| B-side | 100 g | Soy Oil |
|---|---|---|
| | 11 g | Ethylene Glycol |
| | 4 g | Methyl Isobutyl Ketone (MIBK) |
| | 3 g | front end catalyst (DABCO 33-VL) |
| | 3 g | Blow catalyst (DABCO BL-22) |

The B-side is as in Example 10. The A-side comprises Mondur 448, and is present in a ratio of 50 parts to 100 parts B-side The resulting foam cures in 15 min., but is very crumbly.

Example 12

| B-side | 100 g | Soy Oil |
|---|---|---|
| | 11 g | Ethylene Glycol |
| | 4 g | Methyl Isobutyl Ketone (MIBK) |
| | 3 g | front end catalyst (DABCO 33-VL) |
| | 3 g | Blow catalyst (DABCO BL-22) |

The B-side is as in Example 10. The A-side comprised 76 parts MA-2901 to 100 parts B-side. The resulting foam cures in 30 minutes, but has a very fast, complete fall back.

Example 13

| B-side | 100 g | Soy Oil |
|---|---|---|
| | 5 g | Ethylene Glycol |
| | 5 g | 1,4 butanediol |
| | 4 g | Methyl Isobutyl Ketone (MIBK) |
| | 2.5 | front end catalyst (DABCO 33-VL) |
| | 2.5 | Blow catalyst (DABCO BL-22) |

Ethylene glycol has a molecular weight of about 62 and 1,4 butanediol has a molecular weight of about 90. Thus, the molar ratio of the ethylene glycol to blown soy oil is 0.22 to 1 and the molar ratio of the 1,4 butanediol to blown soy oil is 0.15 to 1. Since each of the ethylene glycol and 1,4 butanediol have two OH groups with which to cross-link the constituent fatty acids of the blown soy oil, the molar ratio of the OH groups of the 50/50 ethylene glycol/1,4 butanediol mixture to the bulk blown soy oil is about 0.75:1.

The A-side was reacted at 74 parts MA-2901 to 100 parts B-side. The resulting foam cured to the touch within 3 minutes, and fully cured within 15 minutes. It has good properties.

Example 14

| B-side | 100 g | Soy Oil |
|---|---|---|
| | 5 g | Ethylene Glycol |
| | 5 g | 1,4 butanediol |
| | 4 g | Methyl Isobutyl Ketone (MIBK) |
| | 2.5 | Front end catalyst (DABCO 33-VL) |
| | 2.5 | Back end catalyst (POLYCAT 41) |
| | 2 | Blow catalyst (DABCO BL-22) |

The A-side was reacted at 74 parts MA-2901 to 100 parts B-side. The resulting foam cured to the touch within 3 minutes, with a bit better initial strength than the foam of Example 13. It fully cured within 15 minutes, with good properties.

Example 15

| B-side | 200 g | Soy Oil |
|---|---|---|
| | 7 g | Ethylene Glycol |
| | 16 g | 1,4 butanediol |
| | 2.5 | Front end catalyst (DABCO 33-VL) |
| | 2.5 | Blow catalyst (DABCO BL-22) |
| | 2 | back end catalyst (POLYCAT 41) |

The molar ratio of the ethylene glycol to blown soy oil is 0.15 to 1 and the molar ratio of the 1,4 butanediol to blown soy oil is 0.24 to 1. Since each of the ethylene glycol and 1,4 butanediol have two OH groups with which to cross-link the constituent fatty acids of the blown soy oil, the molar ratio of the OH groups of the 50/50 ethylene glycol/1,4 butanediol mixture to bulk blown soy oil is about 0.80:1.

The A-side was reacted at 74 parts MA-2901 to 100 parts B-side. The resulting foam had very good qualities, with good rebound and fast cure (tack-free after 90 seconds) and soft with good rebound after 1 hour.

Example 16

The B-side is the same blend as Example 15. The A-side comprises Mondur 448. The A-side was reacted at 74 parts to 100 parts B-side. The resulting foam was a stiff flexible foam with good rebound and good reaction times. Good properties after 1 hour.

Example 17

| B-side | 100 g | Soy Oil |
|---|---|---|
| | 5 g | Ethylene Glycol |
| | 5 g | 1,4 butanediol |
| | 2.5 | front end catalyst (DABCO 33-VL) |
| | 2.5 | Blow catalyst (DABCO BL-22) |
| | 2.0 | back end catalyst (POLYCAT 41) |
| | 2.0 | L-past (molecular sieves) |

The molar ratio of the OH groups of the 50/50 ethylene glycol/1,4 butanediol mixture to soy oil is again about 0.75:1.

The A-side comprises a 50/50 blend of MA-2901 and Mondur 448. The A-side was reacted at 74 parts to 100 parts B-side. The resulting foam is a good foam with good flexibility, high density, but still needs tensile work.

Example 18

| B-side | 200 g | Soy Oil |
|---|---|---|
| | 5 g | Ethylene Glycol |
| | 21 g | 1,4 butanediol |
| | 5.0 | Front end catalyst (DABCO 33-VL) |
| | 5.0 | Blow catalyst (DABCO BL-22) |
| | 2.0 | back end catalyst (POLYCAT 41) |
| | 6.0 | L-past (molecular sieves) |

The molar ratio of the OH groups of the 5/21 ethylene glycol/1,4 butanediol mixture to bulk blown soy oil is about 0.85:1.

The A-side comprises a 50/50 blend of MA-2901 and Mondur 448. The A-side was reacted at 74 parts to 100 parts B-side. The resulting foam is very similar to that of Example 17 and is a good foam with good flexibility, high density, but still needs tensile work.

Example 19

| B-side | 200 g | Soy Oil |
|---|---|---|
| | 22 g | Ethylene Glycol |
| | 4 g | 1,4 butanediol |
| | 2.5 | Front end catalyst (DABCO 33-VL) |
| | 2.5 | Blow catalyst (DABCO BL-22) |
| | 5.0 | Back end catalyst (POLYCAT 41) |
| | 16.0 | L-past (molecular sieves) |
| | 4.0 | Silicone surfactants (DABCO DC5160) |

The molar ratio of the OH groups of the 22/4 ethylene glycol/1,4 butanediol mixture to bulk blown soy oil is about 1.10:1.

The A-side comprises MA-2901, and was reacted at 74 parts to 100 parts B-side. The resulting foam has very good properties. It is almost a solid elastomer with good rebound.

Example 20

| B-side | 200 g | Soy Oil |
|---|---|---|
| | 22 g | Ethylene Glycol |
| | 4 g | 1,4 butanediol |
| | 10 g | Methylene Chloride |
| | 2.5 | Front end catalyst (DABCO 33-VL) |
| | 2.5 | Blow catalyst (DABCO BL-22) |
| | 5.0 | Back end catalyst (POLYCAT 41) |
| | 16.0 | L-paste (molecular sieves) |
| | 4.0 | Silicone surfactants (DABCO DC5160) |

The molar ratio of the OH groups of the 22/4 ethylene glycol/1,4 butanediol mixture to bulk blown soy oil is again about 1.10:1. The A-side comprises MA-2901 and was reacted at 74 parts to 100 parts B-side. The resulting foam is a very good foam, with uniform cell size, good flex, moderate density, good rebound and higher tensile.

Example 21

| B-side | 200 g | Soy Oil |
|---|---|---|
| | 22 g | Ethylene Glycol |
| | 4 g | 1,4 butanediol |
| | 10 g | Methylene Chloride |
| | 2.5 | Front end catalyst (DABCO 33-VL) |
| | 2.5 | Blow catalyst (DABCO BL-22) |
| | 5.0 | back end catalyst (POLYCAT 41) |
| | 16.0 | L-paste (molecular sieves) |
| | 4.0 | Silicone surfactants (DABCO DC5160) |
| | 2.0 | Green pigment |

The molar ratio of the OH groups of the 22/4 ethylene glycol/1,4 butanediol mixture to bulk blown soy oil is again about 1.10:1. The A-side comprises MA-2901, and was reacted at 81 parts to 100 parts B-side.

Example 22

| B-side | 200 g | Soy Oil |
|---|---|---|
| | 22 g | Ethylene Glycol |
| | 4 g | 1,4 butanediol |
| | 12 g | Methylene Chloride |
| | 2.5 | Front end catalyst (DABCO 33-VL) |
| | 2.5 | Blow catalyst (DABCO BL-22) |

|      |                              |
|------|------------------------------|
| 5.0  | Back end catalyst (POLYCAT 41) |
| 16.0 | L-paste (molecular sieves)   |
| 4.0  | Silicone surfactants (DABCO DC5160) |
| 2.0  | Green pigment                |

The molar ratio of the OH groups of the 22/4 ethylene glycol/1,4 butanediol mixture to bulk blown soy oil is again about 1.10:1. The A-side comprises MA-290 1, and was reacted at 80 parts to 100 parts B-side. The resulting foam is a good foam. It is a stiffer flexible foam, with good cell size, good uniformity and low to moderate density.

Example 23

| B-side | 400 g | Soy Oil |
|--------|-------|---------|
|        | 35 g  | Ethylene Glycol |
|        | 15 g  | 1,4 butanediol |
|        | 24 g  | Methylene Chloride |
|        | 5.0   | Front end catalyst (DABCO 33-VL) |
|        | 5.0   | Blow catalyst (DABCO BL-22) |
|        | 9.0   | Back end catalyst (POLYCAT 41) |
|        | 32.0  | L-paste (molecular sieves) |
|        | 12.5  | Silicone surfactants (DABCO DC5160) |
|        | 4.0   | Green pigment |

The molar ratio of the OH groups of the 35/15 ethylene glycol/1,4 butanediol mixture to bulk blown soy oil is about 1.00:1.

The A-side comprises MA-290 1, and was reacted at 74 parts to 100 parts B-side. The resulting foam is low in density with poor tensile strength.

Example 24

| B-side | 235 g | Soy Oil |
|--------|-------|---------|
|        | 25 g  | Ethylene Glycol |
|        | 6.0   | 1,4 butanediol |
|        | 2.0   | Front end catalyst (DABCO 33-VL) |
|        | 12    | Methylene Chloride |
|        | 2.0   | Blow catalyst (DABCO BL-22) |
|        | 1.75  | back end catalyst (POLYCAT 41) |
|        | 25.0  | L-paste (molecular sieves) |

The molar ratio of the OH groups of the 25/6 ethylene glycol/1,4 butanediol mixture to soy oil is about 1.50:1.

The A-side comprises Mondur MRS-20, and was reacted at 70 parts to 100 parts B-side. The resulting reaction had no foaming and no real reaction.

Example 25

Example 24 is repeated with A-side comprising Mondur-PF. Again, no foaming and not a good reaction.

Example 26

Example 24 is again repeated, with the A-side this time comprising a 50/50 mixture of MA-2901 and Mondur 448. It is reacted at 70 parts to 100 parts B-side.

| Example | Polyol | Crosslinker | Crosslinker | OH/soya ratio | Blowing Agent | Front end cat. | Blow catalysts | Back end cat | Molecular sieves |
|---------|--------|-------------|-------------|---------------|---------------|----------------|----------------|--------------|------------------|
| 1       | soy oil | ethylene glycol | | | methyl isobutyl ketone | Dabco 33-VL | Dabco BL-22 | | |
|         | 50     | 5           |             | 0.448         | 4             | 1              | 1              |              |                  |
| 2       | *      | *           |             |               | *             | *              | *              |              |                  |
|         | 50     | 5           |             | 0.448         | 4             | 1              | 1              |              |                  |
| 3       | *      | *           |             |               | methanol      | *              | *              |              |                  |
|         | 50     | 5           |             | 0.448         | 1.5           | 1              | 1              |              |                  |
| 4       | *      | *           |             |               | methyl isobutyl ketone | *     | *              |              |                  |
|         | 100    | 5           |             | 0.448         | 4             | 2.5            | 2.5            |              |                  |
| 5       | *      | *           |             |               | *             | *              | *              |              |                  |
|         | 100    | 5           |             | 0.448         | 4             | 2.5            | 2.5            |              |                  |
| 6       | *      | *           |             |               | acetone       | *              | *              |              |                  |
|         | 103    | 10          |             | 0.871         | 11            | 2.5            | 2.5            |              |                  |
| 7       | *      | *           |             |               | *             | *              | *              |              |                  |
|         | 100    | 8           |             | 0.718         | 5             | 2.5            | 2.5            |              |                  |
| 8       | *      | *           |             |               | *             | *              | *              |              |                  |
|         | 100    | 8           |             | 0.718         | 5             | 2.5            | 2.5            |              |                  |
| 9       | *      | *           |             |               | *             | *              | *              |              |                  |
|         | 100    | 8           |             | 0.719         | 5             | 2.5            | 2.5            |              |                  |
| 10      | *      | *           |             |               | methyl isobutyl ketone | *     | *              |              |                  |
|         | 100    | 11          |             | 0.986         | 4             | 3              | 3              |              |                  |
| 11      | *      | *           |             |               | *             | *              | *              |              |                  |
|         | 100    | 11          |             | 0.986         | 4             | 3              | 3              |              |                  |
| 12      | *      | *           |             |               | *             | *              | *              |              |                  |
|         | 100    | 11          |             | 0.986         | 4             | 3              | 3              |              |                  |
| 13      | *      | *           | 1,4 butanediol |            | *             | *              | *              |              |                  |
|         | 100    | 5           | 5           | 0.759         | 4             | 2.5            | 2.5            |              |                  |
| 14      | *      | *           | *           |               | *             | *              | *              | Polycat 41   |                  |
| *       | 100    | 5           | 5           | 0.759         | 4             | 2.5            | 2              | 2.5          |                  |
| 15      | *      | *           | *           |               | *             | *              | *              | *            |                  |
|         | 200    | 7           | 16          | 0.808         |               | 2.5            | 2.5            | 2            |                  |
| 16      | *      | *           | *           |               |               | *              | *              | *            |                  |
|         | 200    | 7           | 16          | 0.808         |               | 2.5            | 2.5            | 2            |                  |

-continued

| | | | | | | | | | |
|---|---|---|---|---|---|---|---|---|---|
| 17 | * | * | * | | | * | * | * | L-past |
|  | 100 | 5 | 5 | 0.769 | | 2.5 | 2.5 | 2 | 2 |
| 18 | * | * | * | | | * | * | * | * |
|  | 200 | 5 | 21 | 0.866 | | 5 | 5 | 2 | 6 |
| 19 | * | * | * | | | * | * | * | * |
|  | 200 | 22 | 4 | 1.108 | | 2.5 | 2.5 | 5 | 16 |
| 20** | * | * | * | | methylene chloride | * | * | * | * |
|  | 100 | 22 | 4 | 1.108 | 10 | 2.5 | 2.5 | 5 | 16 |
| 21 | * | * | * | | * | * | * | * | * |
|  | 200 | 22 | 4 | 1.108 | 10 | 2.5 | 2.5 | 5 | 16 |
| 22 | * | * | * | | * | * | * | * | * |
|  | 200 | 22 | 4 | 1.108 | 12 | 2.5 | 2.5 | 5 | 16 |
| 23 | * | * | * | | * | * | * | * | * |
|  | 400 | 28 | 15 | 1.008 | 24 | 5 | 5 | 9 | 32 |
| 24 | * | * | * | | * | * | * | * | * |
|  | 235 | 26 | 6 | 1.489 | 12 | 5 | 5 | 9 | 32 |
| 25 | * | * | * | | * | * | * | * | * |
|  | 235 | 26 | 6 | 1.489 | 12 | 5 | 5 | 9 | 32 |
| 26 | * | * | * | | * | * | * | * | * |
|  | 235 | 26 | 6 | 1.489 | 12 | 5 | 5 | 9 | 32 |

| Example | Surfactants | Pigments | Isocyante | B side | Results | Cure | Stability | Foam | Tensile | Density | Comments |
|---|---|---|---|---|---|---|---|---|---|---|---|
| 1 | | | Mondur 448 50 | 100 | ok | 20 min | stable | good | fair | 12 p.c.f. | |
| 2 | | | MA-2901 52 | 100 | ok | 12 min | stable | good | weak | 13 p.c.f. | |
| 3 | | | MA-2901 52 | 100 | poor | 1 hr | fell back | none | weak | 60 p.c.f. | meth. adverse |
| 4 | | | MA-2901 50 | 100 | fair | 8 min | stable | good | weak | 12 p.c.f. | |
| 5 | | | MA-2901 62 | 100 | fair | 6 min | stable | good | fair | 11 p.c.f. | better tensile |
| 6 | | | MA2901 62 | 100 | poor | 10 min + | fell back | too large | | 55 p.c.f. | too much blow |
| 7 | | | * 51 | 100 | good | 10 min | stable | good | low | 15 p.c.f. | |
| 8 | | | * 45 | 100 | good | | | good | low | better | |
| 9 | | | * 72 | 100 | poor | 2 hr | fell back | none | | 65 p.c.f. | too much iso |
| 10 | | | * 60 | 100 | poor | 72 hr | stable | good | low | 15 p.c.f. | 72 hour cure |
| 11 | | | Mondur 440 50 | 100 | poor | 15 min | crumbly | fair | weak | 20 p.c.f. | |
| 12 | | | MA 2901 76 | 100 | poor | 30 min | fell back | none | | 55 p.c.f. | fast cure |
| 13 | | | MA 2901 74 | 100 | good | 15 min | good | good | punky | 12 p.c.f. | 3 min to touch |
| 14 | | | MA 2901 74 | 100 | good | 15 min | good | good | avg. | 12 p.c.f. | better green |
| 15 | | | MA 2901 74 | 100 | very good | fast | rebound | good | abov avg. | 12 p.c.f. | good rebound |
| 16 | | | MA 2901/Mondur 448 74 | 100 | very good | 1 hr | stiffer | good | abov avg. | 14 p.c.f. | good rebound |
| 17 | | | MA 2901/Mondur 448 74 | 100 | good | 10 min | flexible | good | weak | 30 p.c.f. | good rebound |
| 18 | | | MA 2901/Mondur 448 74 | 100 | good | 5 min | flexible | good | avg. | 40 p.c.f. | good rebound |
| 19 | Dabco DC 5160 4 | | MA 2901/Mondur 448 74 | 100 | very good | 5 min | flexible | high density | abov. avg. | 45 p.c.f. | good rebound |
| 20 | * 4 | | MA 2901/Mondur 448 74 | 100 | very good | 3 min | flexible | uniform | high | 22 p.c.f. | good rebound |
| 21 | * 4 | green 2 | MA 2901/Mondur 448 81 | 100 | ? | | | | | | |
| 22 | * 4 | green 2 | MA 2901/Mondur 448 80 | 100 | good | 3 min. | flexible | good | stiffer | 18 p.c.f. | good |
| 23 | * 12.5 | green 4 | MA 2901 74 | 100 | fair | 10 min | flexible | foam | low | 3 p.c.f. | poor foam |
| 24 | * 12.5 | | MRS-20 70 | 100 | bad | 8 min | flexible | good | very low | 4 p.c.f. | no reaction |

-continued

| | | | | | | | | |
|---|---|---|---|---|---|---|---|---|
| 25 | *  12.5 | ISO PF  70 | 100 | bad | none | none | low | n/s | no reaction |
| 26 | *  12.5 | MA-2901/Mondur 448  70 | 100 | ? | | | | | |

*first time back end cure cat. was used
**methylene chloride used first time

The advantages of the disclosed cellular foams and methods of making are thus attained in an economical, practical, and facile manner. While preferred embodiments and example configurations have been shown and described, it is to be understood that various further modifications and additional configurations will be apparent to those skilled in the art. It is intended that the specific embodiments and configurations herein disclosed are illustrative of the preferred and best modes for practicing the invention, and should not be interpreted as limitations on the scope of the invention as defined by the appended claims.

What is claimed is:

1. A cellular plastic material, comprising the reaction product of an A-side and a B-side, wherein said A-side is comprised of an diisocyanate and said B-side is comprised of a vegetable oil, a cross-linking agent comprised of a multi-functional alcohol present in a ratio to said vegetable oil such that there are at least 0.7 moles of OH groups per mole of bulk vegetable oil, a catalyst and a blowing agent.

2. The cellular plastic material as in claim 1 wherein said vegetable oil is chosen from the group comprising soy oil, rapeseed oil or palm oil.

3. The cellular plastic material as in claim 1 wherein said vegetable oil comprises blown soy oil.

4. The cellular plastic material as in claim 1 wherein said catalyst is a tertiary amine.

5. A method of preparing a cellular plastic material comprising the steps of combining an A-side material with a B-side material; wherein said A-side comprises an diisocyanate and said B-side material comprises blown soy oil, a cross-linker comprised of a multi-functional alcohol, present in a ratio with said soy oil such that there is at least 0.7 moles of OH group per mole of bulk soy oil, a catalyst and a blowing agent.

6. A method of selectively preparing cellular plastic materials comprising the steps of reacting an A-side material with a B-side material, wherein said A-side comprises an isocyanate and said B-side material comprises blown soy oil, a multi-functional alcohol cross-linking agent present in such quantities that a ratio of moles of OH groups to moles of bulk soy oil is between 0.7 and 1.2 equivalent moles of OH groups to one mole of bulk soy oil, a tertiary amine catalyst and a blowing agent.

7. The method of selectively preparing a cellular plastic material in claim 6, wherein the multi-functional alcohol cross-linking agent comprises a blend of ethylene glycol and 1,4 butanediol.

8. The method of selectively preparing a cellular plastic material as in claim 6, wherein the blowing agent is selected from the group consisting of methyl isobutyl ketone, acetone and methylene chloride.

9. The method of selectively preparing a cellular plastic material as in claim 6, wherein the ratio of the A-side to the B-side is 70 to 85 parts to 100 parts.

10. A polyurethane cellular plastic comprising the reaction product of an A-side and a B-side, wherein said A-side comprises an diisocyanate and said B-side is comprised of bulk soy oil, a cross-linking agent comprised of a multi-functional alcohol present in a ratio to said bulk soy oil such that there are at least 0.7 moles of OH groups per mole of bulk soy oil, a catalyst and a blowing agent.

11. The polyurethane cellular plastic of claim 10, wherein the multi-functional alcohol is present in a ratio to said bulk soy oil such that there are between 0.7 to 1.2 moles OH groups per mole of bulk soy oil, said catalyst is present in the amount of at least 2.5 parts and said isocyanate is present in the amount of 70 parts per 100 parts of the B-side.

12. A cellular plastic foam material, comprising the reaction product of between 70 and 85 parts of an A-side material and 100 parts of a B-side material, wherein said A-side material comprises an isocyanate and said B-side material comprises 100 parts of blown soy oil, between 8 to 18 parts cross-linking agent providing at least 0.7 moles of OH groups per mole of bulk vegetable oil, 1 to 12 parts catalyst and 2 to 14 parts blowing agent.

13. A cellular plastic foam material, comprising the reaction product of 70 to 85 parts of an A-side material and 100 parts of a B-side material, wherein said A-side material comprises an isocyanate and said B-side material comprises 100 parts blown soy oil, from 8 to 16 parts cross linking agent providing 0.70 to 1.2 moles OH per mole soy oil, from 2.5 to 11 parts catalyst and from 5 to 13 parts blowing agent.

14. A cellular plastic foam material comprising the reaction product of 70 to 85 parts of an A-side material with 100 parts of a B-side material, wherein said A-side comprises an isocyanate and said B-side comprises 100 parts blown soy oil, from 9 to 14 parts cross linking-agent providing 0.70 to 1.2 moles OH per mole soy oil, from 2 to 6 parts catalyst and from 4 to 9 parts blowing agent.

15. The cellular plastic foam material of claim 14, wherein said foam has at least 60% open cells.

16. The cellular plastic foam material of claim 14, wherein said cellular plastic foam material has a density of between approximately 30 lb. to 1.5 lb. per cubic foot, and a durometer of approximately 40 to 50 shore "A".

17. The cellular plastic foam material of claim 14, wherein said catalyst comprises a tertiary amine.

18. The cellular plastic foam material of claim 14, wherein said catalyst comprises a mixture of a front end catalyst with a back end catalyst.

19. The cellular plastic foam material of claim 14, wherein said catalyst is chosen from the group comprising a mixture of 33% 1,4-diaza-bicyclo-octane and 67% dipropylene glycol; a tertiary amine blowing catalyst; and n, n', n", dimethylamino-propyl-hexahydrotriazine tertiary amine.

20. The cellular plastic foam material of claim 14, wherein said cross-linker is chosen from the group comprising ethylene glycol, and 1,4 butanediol.

21. The cellular plastic foam material of claim 14, wherein said cross-linker comprises a mixture of 1,4 butanediol and ethylene glycol.

22. The cellular plastic foam material of claim 14, wherein said blowing agent is chosen from the group comprising water, acetone, methyl isobutyl ketone, methylene chloride, and 134A refrigerant.

23. The cellular plastic foam material of claim 14, wherein said isocyanate is chosen from the group consisting of 2,4 diisocyanate, 4,4 diphenylmethane diisocyanate and 2,4 diphenylmethane diisocyanate.

24. The cellular plastic foam material of claim 14, wherein said B-side material further comprises from 2–5 parts surfactant agent for effecting foam cell size.

25. The cellular plastic foam material of claim 14, wherein said B-side material further comprises from 7–12 parts molecular sieve agent for absorbing water.

26. A solid plastic elastomer comprising the reaction product of 70 to 85 parts of an A-side material and 100 parts of a B-side material, wherein said A-side material comprises an isocyanate and said B-side material comprises 100 parts blown soy oil, 8 to 20 parts cross-linking agent and from 1 to 15 parts catalyst.

* * * * *

UNITED STATES PATENT AND TRADEMARK OFFICE
CERTIFICATE OF CORRECTION

PATENT NO.    : 6,180,686 B1
DATED         : January 30, 2001
INVENTOR(S)   : Thomas M. Kurth It is certified that error appears in the above-identified patent and that said Letters Patent is hereby corrected as shown below:

Column 2,
Line 42, delete "a";

Column 4,
Line 23, "flexibility's should be -- flexibilities --;
Line 34, before "petroleum" insert -- are --;

Column 6,
Line 32, "a" should be -- an --;
Lines 66-67, delete "when read in conjunction with the accompanying dawing";

Column 7,
Line 39, "("MDF")" should be -- "MDI" --;

Column 8,
Line 17, delete "has a" (second occurrence);
Lines 50-55, "2.5" should be -- 2.5g --;

Column 9,
Lines 8-9 and 26-27, "2.5" should be -- 2.5g --;
Line 41, "ration" should be -- ratio --;
Line 59, "sown" should be -- blown --;

Column 10,
Lines 35-36 and 60-61 "2.5" should be -- 2.5g --;
Line 62, "2" should be -- 2g --;

Column 11,
Lines 7-8 and 36-37, "2.5" should be -- 2.5g --;
Line 9, "2" should be -- 2g --;
Lines 38-39, "2.0" should be -- 2.0g --;
Lines 55-56, "5.0" should be -- 5.0g --;
Line 57, "2.0" should be -- 2.0g --;
Line 58, "6.0" should be -- 6.0g --;

UNITED STATES PATENT AND TRADEMARK OFFICE
CERTIFICATE OF CORRECTION

PATENT NO. : 6,180,686 B1
DATED : January 30, 2001
INVENTOR(S) : Thomas M. Kurth It is certified that error appears in the above-identified patent and that said Letters Patent is hereby corrected as shown below:

Column 12,
Lines 7-8, 27-28 and 47-48, "2.5" should be -- 2.5g --;
Lines 9, 29 and 49, "5.0" should be -- 5.0g --;
Lines 10, 30 and 50, "16.0" should be -- 16.0g --;
Lines 11, 31 and 51, "4.0" should be -- 4.0g --;

Column 13,
Lines 3 and 21-22, , "5.0" should be -- 5.0g --;
Line 4, , "16.0" should be -- 16.0g --;
Lines 5 and 26, , "4.0" should be -- 4.0g --;
Line 6, , "2.0" should be -- 2.0g --;
Line 23, , "9.0" should be -- 9.0g --;
Line 24, , "32.0" should be -- 32.0g --;
Line 25, , "12.5" should be -- 12.5g --;

Column 14,
Line 6, , "6.0" should be -- 6.0g --;
Line 8, "12" should be -- 12g --;
Line 9, "2.0" should be -- 2.0g --;
Line 10, "1.75" should be -- 1.75g --;
Line 11, "25.0" should be -- 25.0g --;

Columns 13-14,
Example 9, "0.719" should be -- 0.718 --;

Columns 15-16,
Example 23 (first occurrence); "28" should be -- 35 --;
Example 24 (first occurrence); "26" should be -- 25 --;
Example 25, "26" should be -- 25 --;
Example 26, "26" should be -- 25 --;
Example 3, "60 p.c.f." should be -- 50 p.c.f. --;
Example 5, "6 min" should be -- 5 min --;
Example 5, "62" should be -- 52 --;
Example 6, "62" should be -- 52 --;
Example 9, "65 p.c.f." should be -- 55 p.c.f. --;
Example 10, "60" should be -- 50 --;
Example 11, "440" should be -- 448 --;

UNITED STATES PATENT AND TRADEMARK OFFICE
CERTIFICATE OF CORRECTION

PATENT NO. : 6,180,686 B1
DATED : January 30, 2001
INVENTOR(S) : Thomas M. Kurth It is certified that error appears in the above-identified patent and that said Letters Patent is hereby corrected as shown below:

<u>Columns 17-18</u>,
Example 25, "n/s" should be -- n/a --;

Signed and Sealed this

Tenth Day of August, 2004

JON W. DUDAS
*Acting Director of the United States Patent and Trademark Office*